(12) United States Patent
Lugo et al.

(10) Patent No.: US 8,757,960 B2
(45) Date of Patent: Jun. 24, 2014

(54) SHAFT SUPPORT FOR AIR CYCLE MACHINE

(75) Inventors: Valentina Lugo, Hartford, CT (US); Craig M. Beers, Wethersfield, CT (US); Victoria S. Richardson, Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 726 days.

(21) Appl. No.: 12/974,130

(22) Filed: Dec. 21, 2010

(65) Prior Publication Data

US 2012/0156017 A1 Jun. 21, 2012

(51) Int. Cl.
*F01D 25/04* (2006.01)

(52) U.S. Cl.
USPC ............ 415/115; 415/261.1; 416/244 R

(58) Field of Classification Search
USPC ............ 415/115, 170.1, 216.1, 229; 416/174, 416/244, 244 R
See application file for complete search history.

(56) References Cited

U.S. PATENT DOCUMENTS

| | | | |
|---|---|---|---|
| 3,299,722 A | 1/1967 | Bodine, Jr. | |
| 3,393,023 A | 7/1968 | Christian | |
| 5,224,842 A | 7/1993 | Dziorny et al. | |
| 5,249,934 A | 10/1993 | Merritt et al. | |
| 5,309,735 A | 5/1994 | Maher, Jr. et al. | |
| 5,311,749 A | 5/1994 | McAuliffe et al. | |
| 5,571,244 A | 11/1996 | Andres | |
| 5,697,848 A | 12/1997 | Bosley | |
| 6,024,491 A | 2/2000 | Bak | |
| 6,607,157 B1 | 8/2003 | Duescher | |
| 7,757,502 B2 | 7/2010 | Merritt et al. | |
| 7,997,853 B2 | 8/2011 | Pique et al. | |
| 8,141,337 B2 | 3/2012 | Porte et al. | |
| 2008/0273966 A1* | 11/2008 | Maffeis | 415/170.1 |
| 2009/0238689 A1* | 9/2009 | Jamil et al. | 415/229 |

OTHER PUBLICATIONS

CN Office Action for 201110432552.6 Received Feb. 10, 2014.

* cited by examiner

*Primary Examiner* — Edward Look
*Assistant Examiner* — Maxime Adjagbe
(74) *Attorney, Agent, or Firm* — Carlson, Gaskey & Olds, P.C.

(57) ABSTRACT

An example shaft support includes a cylindrical body establishing a bore extending along an axis. The bore is configured to receive a shaft. Openings are provided in the cylindrical body and distributed circumferentially about the axis. The openings are positioned radially outward of the bore. Each of the openings has a cross-sectional area. The ratio of a total cross sectional area of the openings to a diameter of the cylindrical body is between 0.0963 and 0.0964.

24 Claims, 2 Drawing Sheets

US 8,757,960 B2

SHAFT SUPPORT FOR AIR CYCLE MACHINE

BACKGROUND

This disclosure relates to a tie rod support incorporated into an air cycle machine that supplies air to an aircraft cabin.

Air cycle machines are known, and typically include a turbine and a compressor. Compressed air from the compressor is expanded across the turbine to rotatably drive the turbine, which rotates a shaft to rotatably drive the compressor. The shaft is often referred to as a tie rod.

Bearings and supports in the air cycle machine hold the shaft. The supports rotate with the shaft and are configured to reduce vibrations of the shaft during rotation. The supports often include passages used to communicate air axially within the air cycle machine. For example, some air passes through passages in the supports when moving from the compressor and turbine toward a fan section of the air cycle machine. The air cools portions of the air cycle machine, such as the bearings, and is then expelled from the air cycle machine after moving through the fan section. The sizing, spacing, and orientation of the passages influences movement of the air through the passages.

SUMMARY

An example shaft support includes a cylindrical body establishing a bore extending along an axis. The bore is configured to receive a shaft. Openings are provided in the cylindrical body and distributed circumferentially about the axis. The openings are positioned radially outward of the bore. Each of the openings has a cross-sectional area. The ratio of a total cross sectional area of the openings to a diameter of the cylindrical body is between 0.2154 and 0.2165.

An example air cycle machine includes a turbine section, a compressor section, a fan section, a shaft extending along an axis, and a shaft support. The support is radially outward of the shaft relative to the axis. The support has a cylindrical body with a bore configured to receive the shaft. The support also has openings distributed circumferentially about the axis and positioned radially outward of the bore to allow air flow from the turbine section and the compressor section to move to the fan section. Each of the openings has a cross-sectional area such that a ratio of a total cross sectional area of the plurality of openings to a diameter of the cylindrical body is between 0.0963 and 0.0964.

An example method of installing a shaft support in an air cycle machine includes providing a shaft support that has a cylindrical body, a bore in the cylindrical body configured to receive a shaft of the air cycle machine, and a plurality of openings radially outward of the bore. The openings each have a cross-sectional area, and the ratio of a total cross sectional area of the plurality of openings to a first diameter is between 0.2226 and 0.2235. The support is inserted into a cavity within the air cycle machine. The shaft passes through the bore in the cylindrical body within the cavity such that the support is radially outward of the shaft.

These and other features of the present invention can be best understood from the following specification and drawings, the following of which is a brief description.

DETAILED DESCRIPTION

Figure 1:
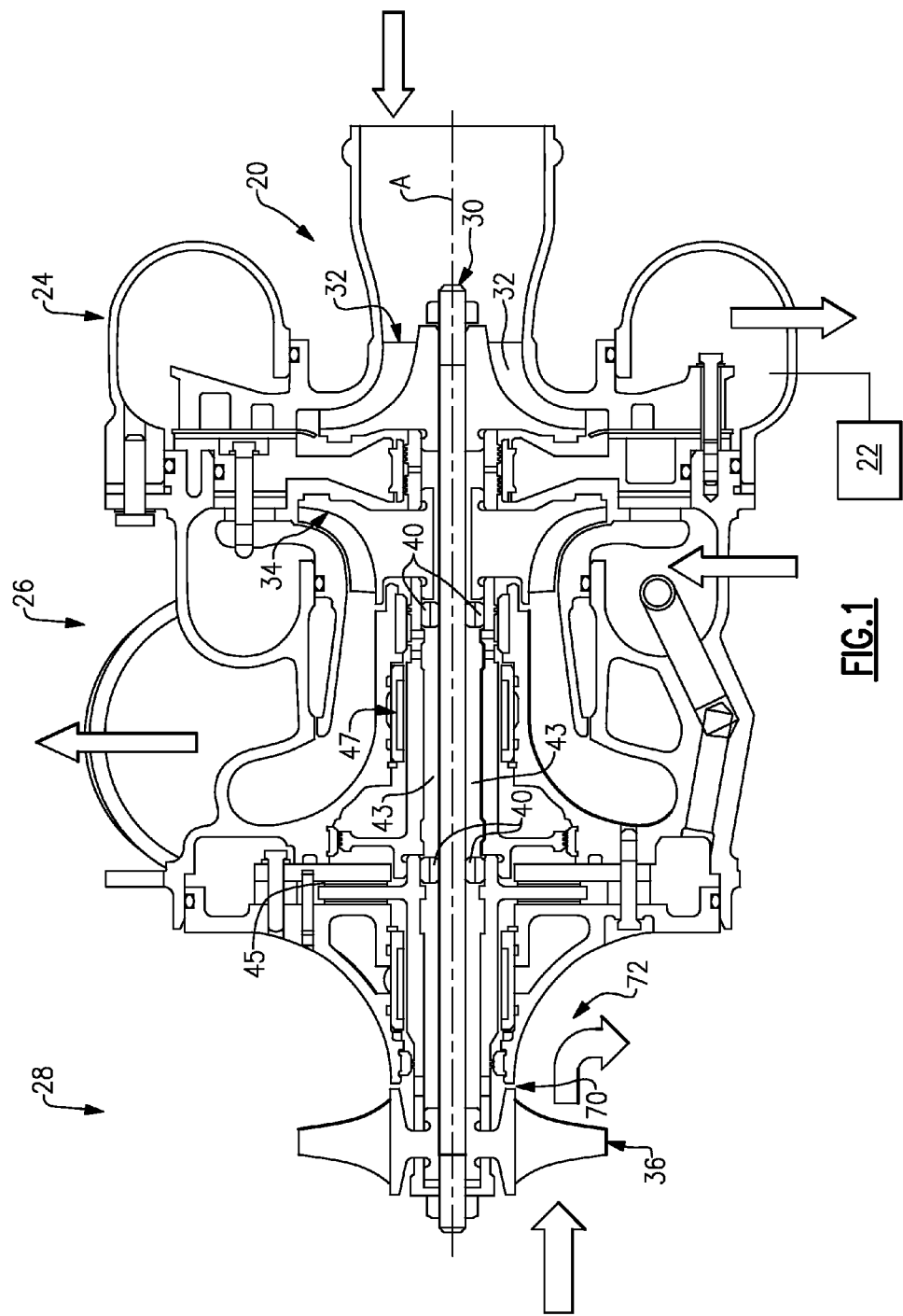
FIG. 1 is a cross-sectional view of an example air cycle machine.

Referring to FIG. 1, an example air cycle machine 20 ("ACM") is incorporated into an air supply system 22 of a vehicle, such as an aircraft, helicopter, or land-based vehicle. The ACM 20 includes a compressor section 24, a turbine section 26, and a fan section 28 that are generally disposed about a main shaft 30. The main shaft 30 may be considered a tie rod shaft in some examples. The compressor section 24 includes a compressor rotor 32, the turbine section 26 includes a turbine rotor 34, and the fan section 28 includes a fan rotor 36. The compressor rotor 32, turbine rotor 34, and fan rotor 36 are secured on the main shaft 30 for co-rotation about an axis A.

A plurality of shaft supports 40 are provided along axis A. The shaft supports 40 are positioned axially based on frequency of the shaft 30 to lessen vibration of the shaft 30. Other examples position the shaft supports 40 based on other factors. During operation, the shaft supports 40 are configured to rotate about axis A along with the shaft 30. In one example, the shaft supports 40 are made of a polymide material, and the shaft 30 is made of a titanium alloy.

Figure 2:
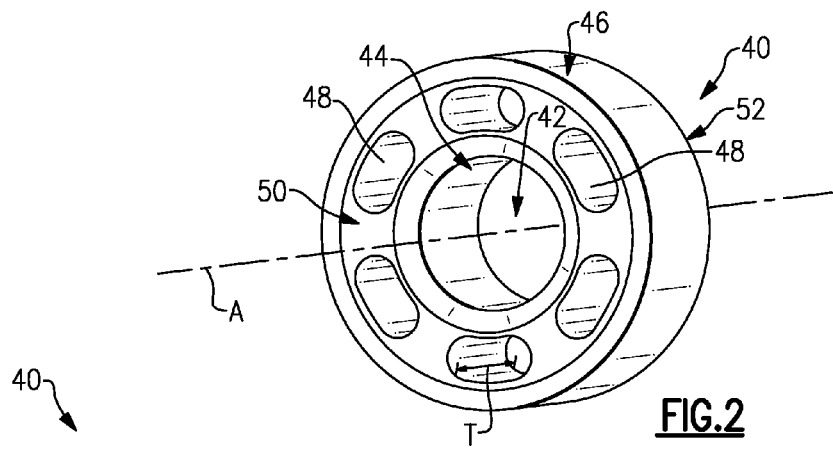
FIG. 2 is a perspective view of an example tie rod support within the FIG. 1 air cycle machine.
Figure 3:
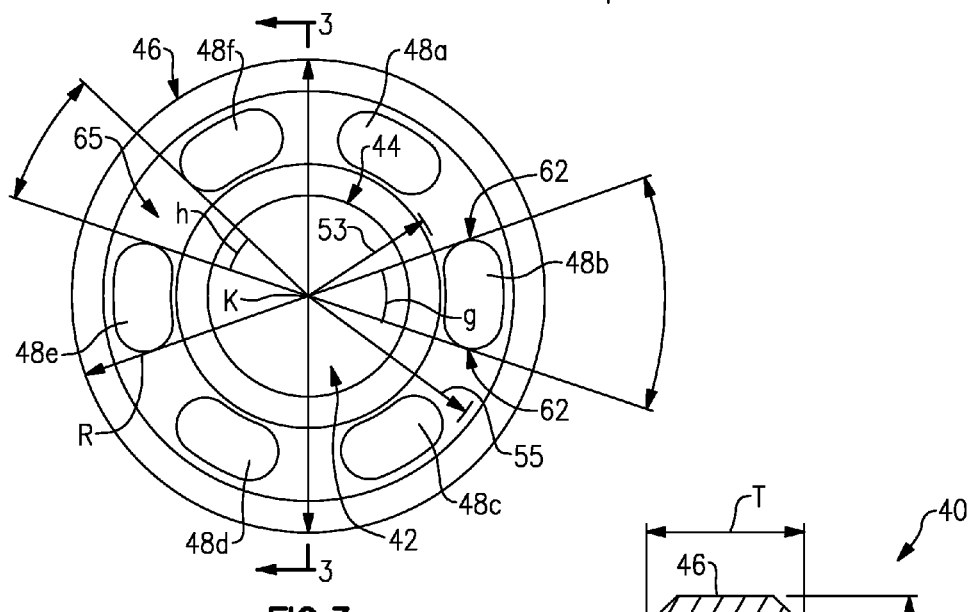
FIG. 3 is an end view of the FIG. 2 tie rod support.
Figure 4:
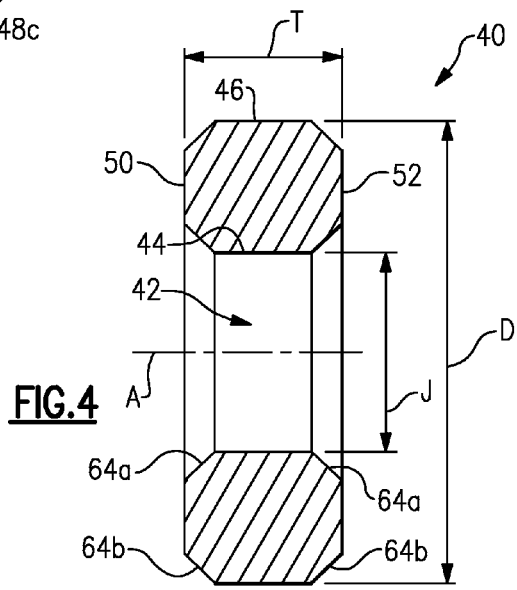
FIG. 4 is a cross-sectional view of the tie rod support at line 3-3 in FIG. 3.

Referring to FIGS. 2-4, one of the example supports 40 has a cylindrical body that establishes a bore 42 configured to receive the shaft 30. The bore 42 extends along the axis A. The support 40 includes a pair of faces 50, 52 on axially opposing sides of the support 40.

The radial boundaries of the shaft support 40 are established by a radially inner side 44 and a radially outer side 46. A plurality of openings 48a-48f are established between the radially inner side 44 and the radially outer side 46. The plurality of openings 48a-48f are radially outward of the bore 42 and extend axially between the face 50 and the face 52. Although six openings 48 are shown, it is within the contemplation of this disclosure to use greater or fewer openings 48. The openings 48 communicate air from the turbine section 26 and the compressor section 24 toward the fan section 28. Each opening 48a-48f has a cross sectional area. In one example, the cross sectional area of each of the individual openings 48a-48f is 0.01 in². In this example, the cross-sectional area of the opening 48a is 0.01 in².

In this example, the openings 48a-48f are uniformly sized. Other examples may utilize non-uniform openings 48. The example openings 48a-48f are also equally spaced circumferentially about the axis A.

A length T defines the thickness of the shaft support 40, the depth of each opening 48, and the depth of the bore 42. In one example, the length T is between 0.205-0.215 inches (0.521-0.546 centimeters).

The diameter D of the example shaft support 40 is 0.6228 inches (1.582 centimeters). However, it is within the contemplation of this disclosure for the diameter D to be in the range of 0.6223-0.6233 inches (1.581-1.583 centimeters).

In this example, the radius R of the shaft support 40 is in the range of 0.31115-0.31165 inches (0.7903-0.7916 centimeters).

The air removes thermal energy from the bearings, for example, before entering the cavity 43. Air flow within the cavity 43 moves through the openings 48a-48f in the shaft supports 40 as the air moves toward the outlet 72. The total cross sectional area provided by the openings 48a-48f for the flow of air is found by adding the cross sectional area of each opening 48a-48f. In some examples changing the total cross-sectional area, the ratio of the total cross sectional area to D is between 0.0963 and 0.0964.

In this example, the openings 48a-48f are oblong. Each opening 48a-48f is defined by ends 62 having a first included angle g of 37° relative to centerpoint K, which is located on axis A. The included angle defines the area between the ends of each opening 48a-48f. Other examples may include angles between 34.4° to 39.6°.

Each opening 48a-48f includes an inner edge at a length 53 from the axis A and an outer edge at a length 55 from the axis A. In this example, the length 53 is 0.185 inches (0.469 centimeters) and the length 55 is 0.260 inches (0.660 centimeters). In other examples, the length 53 ranges between 0.175-0.195 inches (0.444-0.495 centimeters), and the length 55 ranges between 0.250-0.270 inches (0.635-0.686 centimeters). Each of the openings 48a-48f is equally spaced from a centerpoint K of the shaft support 40 in this example.

In some examples, a ratio of the length 53 to the inner edge and the length 55 to the outer edge is 0.7115, and the ratio between g and h is 0.622. In some examples, the ratio of D to T is between 2.89 and 3.04.

The example shaft support 40 includes a plurality of ribs 65 between ends 62 of adjacent openings 48a-48f. Each rib 65 is defined by adjacent ends 62 of adjacent openings 48a-48f having a second included angle h of 23° relative to the centerpoint K. However, it is within the contemplation of this invention for the second included angle h to be in the range of 20.4° to 25.6°.

The shaft support has a bore 42 defined by length J which is in the range of 0.2685-0.2695 inches (0.6819-0.6845 centimeters). The shaft support 40 includes an inner side 44 and an outer side 46 perpendicular to faces 50, 52 on axial sides of the shaft support 40. Chamfered edges 64a, 64b extend between the inner side 44 and the faces 50, 52 and the outer side 46 and the faces 50, 52, respectively. In one example, the chamfered edges 64a, 64b have a length of 0.040 inches (1.02 centimeters). However other chamfered edges 64a, 64b of other lengths to be used. The chamfered edges 64a, 64b allow for easier insertion of the shaft support 40 into the air machine by removing edges that may get caught upon insertion.

In some examples, the ratio of the thickness T of the cylindrical body and length of each chamfered edge is 3.77. In some examples, the shaft support 40 has a diameter D, wherein the ratio of D to J is between 2.31 and 2.32.

The afore mentioned ranges and ratios allow adequate air flow through the shaft support 40 while rotating during body operation of the ACM 20 such that air flow can reach an outlet.

Cooling airflow is provided to the ACM 20 at the turbine inlet during operation. The air flow moves through the turbine section 26 and the thrust bearings 45. After moving through the thrust bearings 45, the airflow turns to move through the journal bearing 47. Having moved through both the bearings, the air flows into a cavity 43 surrounding the shaft 30. The air flow from the journal bearing 47 is combined with air leaked from the compressor rotor 32 and turbine rotor 34. The shaft supports 40 are positioned in the cavity 43 such that the air flow in the cavity is able to move through the openings 48 in the shaft supports 40 while moving through the cavity 43. The air flow then exits the ACM 20 at an opening 70 of the fan outlet 72.

In this example, manufacturing the support 40 includes machining and drilling the bore 42 and the openings 48.

Although preferred embodiments have been disclosed, a worker of ordinary skill in this art would recognize that certain modifications would come within the scope of this invention. For that reason, the following claims should be studied to determine the true scope and content of this disclosure.

What is claimed is:

1. A shaft support comprising:
    a cylindrical body establishing a bore extending along an axis, the bore configured to receive a shaft; and
    a plurality of openings in the cylindrical body distributed circumferentially about the axis and positioned radially outward of the bore, each of the plurality of openings having a cross sectional area, wherein a ratio of a total cross sectional area of the plurality of openings to a diameter of the cylindrical body is between 0.0963 and 0.0964.

2. The shaft support of claim 1, wherein each of the plurality of openings are defined by ends having a first included angle relative to the axis, wherein each opening has an inner edge at a first distance from the axis and an outer edge at a second distance from the axis, the ratio of the first distance to the second distance is 0.7115.

3. The shaft support of claim 2, including a plurality of ribs in the cylindrical body, the ribs defined between adjacent ends of adjacent openings, the ribs having a second included angle relative to the axis, wherein a ratio of the first included angle to the second included angle is 0.622.

4. The shaft support of claim 1, wherein the total cross sectional area is equal to the sum of each cross sectional area of each of the plurality of openings.

5. The shaft support of claim 2, wherein the first included angle is in the range of 34.4° to 39.6°.

6. The shaft support of claim 1, wherein six, equal sized openings are defined in the cylindrical body.

7. The shaft support of claim 1, wherein each opening is equally spaced circumferentially about the axis.

8. The shaft support of claim 1, wherein the cylindrical body has a diameter and a thickness, and the ratio of the diameter to the thickness is between 2.89 and 3.04.

9. The shaft support of claim 1, wherein each opening has a consistent cross section throughout.

10. The shaft support of claim 1, wherein the cylindrical body includes a radially inner side, a radially outer side, and a pair of faces on opposing axial sides of the cylindrical body, wherein the inner side and the outer side are perpendicular to the faces, wherein a plurality of chamfered edges extend between the inner side and the pair of faces and the outer side and the pair of faces.

11. The shaft support of claim 10, wherein a thickness of the cylindrical body and the length of each chamfered edge have a ratio of 3.77.

12. An air cycle machine comprising:
    a turbine section;
    a compressor section;
    a fan section;
    a shaft extending along an axis; and
    a shaft support radially outward of the shaft relative to the axis, the shaft support having a cylindrical body with a bore configured to receive the shaft and a plurality of openings distributed circumferentially about the axis and positioned radially outward of the bore to allow air flow from the turbine section and the compressor section to move to the fan section, each of the plurality of openings having a cross sectional area, wherein a ratio of a total cross sectional area of the plurality of openings to a diameter of the cylindrical body is between 0.0963 and 0.0964.

13. The air cycle machine of claim 12, wherein the shaft support further includes a plurality of ribs, wherein the plurality of openings have ends having a first included angle relative to the axis and the ribs defined by adjacent ends of adjacent openings having a second included angle relative to the opening, wherein the ratio of the first included angle to the second included angle is 0.622.

14. The air cycle machine of claim 12, wherein each opening having an inner edge at a first distance from the axis and an outer edge at a second distance from the axis, and the ratio of the first distance to the second distance is 0.7115.

15. The air cycle machine of claim 12, wherein the shaft support rotates about the axis with the shaft.

16. The air cycle machine of claim 12, wherein the ratio of the diameter of the cylindrical body and a diameter of the bore is between 2.313 and 2.318.

17. The air cycle machine of claim 12, including at least one second shaft support.

18. A method of installing a shaft support in an air cycle machine comprising the steps of:
    providing a shaft support comprising a cylindrical body, a bore in the cylindrical body configured to receive a shaft of the air cycle machine, a plurality of openings radially outward of the bore wherein each of the plurality of openings has a cross sectional area, and the ratio of a total cross sectional area of the plurality of openings to a first diameter of the bore is between 0.2226 and 0.2235;
    inserting the shaft support into a cavity within the air cycle machine; and
    passing the shaft through the bore in the cylindrical body within the cavity such that the shaft support is radially outward of the shaft.

19. The method of claim 18, further including the step of chamfering edges between axial faces of the shaft support and an inner side and the outer side of the shaft support.

20. The shaft support of claim 1, wherein the cylindrical body comprises a polymide material.

21. The shaft support of claim 20, wherein the shaft comprises a titanium alloy.

22. The air cycle machine of claim 12, wherein the air flow includes air flow from a journal bearing, air flow from the compressor rotor, and air flow from the turbine rotor.

23. The air cycle machine of claim 12, wherein the shaft support is positioned axially in response to a frequency of the shaft to provide a desired amount of vibration.

24. The method of claim 18, wherein the plurality of openings are arranged to allow air flow from the turbine section and compressor section to move to the fan section.

* * * * *